United States Patent
Miyagawa et al.

(10) Patent No.: US 8,321,287 B2
(45) Date of Patent: Nov. 27, 2012

(54) RECEIPT PRINTER, RECEIPT PRINTER CONTROL METHOD, AND PROGRAM

(75) Inventors: Akira Miyagawa, Shiojiri (JP); Masashi Aonuma, Shiojiri (JP); Toshio Kuriyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 12/817,420

(22) Filed: Jun. 17, 2010

(65) Prior Publication Data
US 2011/0004530 A1 Jan. 6, 2011

(30) Foreign Application Priority Data
Jul. 2, 2009 (JP) ................... 2009-157647

(51) Int. Cl.
*G07G 1/12* (2006.01)
*G06Q 20/00* (2012.01)
*G06F 21/00* (2006.01)
*G06F 3/12* (2006.01)
*G06K 15/00* (2006.01)

(52) U.S. Cl. ............... 705/24; 705/16; 705/50; 705/64; 358/1.14; 358/1.15

(58) Field of Classification Search ............... None
See application file for complete search history.

(56) References Cited

U.S. PATENT DOCUMENTS

| | | | | |
|---|---|---|---|---|
| 6,293,469 B1 * | 9/2001 | Masson et al. | ............... | 235/476 |
| 7,152,788 B2 * | 12/2006 | Williams | ............... | 235/380 |
| 7,464,862 B2 * | 12/2008 | Bacastow | ............... | 235/380 |
| 2007/0043677 A1 * | 2/2007 | Drapkin | ............... | 705/52 |

FOREIGN PATENT DOCUMENTS

| | | |
|---|---|---|
| JP | 2002-307776 A | 10/2002 |
| JP | 2002-326443 A | 11/2002 |

\* cited by examiner

*Primary Examiner* — Paul Danneman
(74) *Attorney, Agent, or Firm* — Nutter McClennen & Fish LLP; John J. Penny, Jr.; Kevin C. McGrath

(57) ABSTRACT

A receipt printer, a control method for a receipt printer, and a program whereby producing counterfeit printout is not possible. A receipt printer 20 has a storage unit 61 that stores encrypted information obtained by encrypting registered information, a specific information acquisition unit 62 that acquires specific information from a POS terminal 10, a comparison unit 63 that compares the specific information with the registered information decrypted from the encrypted information, a printing permission unit 64 the permits printing when the comparison unit 63 confirms a data match, and a printing unit 65 that prints when printing is permitted by the printing permission unit 64.

19 Claims, 11 Drawing Sheets

RECEIPT PRINTER, RECEIPT PRINTER CONTROL METHOD, AND PROGRAM

BACKGROUND

1. Technical Field

The present invention relates to receipt printer that produces printout requiring counterfeiting prevention, to a method of controlling the receipt printer, and to a program for the same.

2. Related Art

Counterfeit receipts have become an increasingly common problem due to the effects of the global economy. Counterfeit receipts may be used to take products out of a store, or to return products to a store and receive money in return.

There are also counterfeiters that produce and sell counterfeit receipts to customers. Such counterfeiters purchase the same model of receipt printer used by a retailer to produce the counterfeit receipts. In extreme cases, the counterfeiter may even steal the receipt printer from the retailer in order to produce counterfeit receipts.

A printer that is used to produce printout requiring protection against counterfeiting is taught in Japanese Unexamined Patent Appl. Pub. JP-A-2002-326443, for example. The printer taught in JP-A-2002-326443 can produce printout that is difficult to counterfeit and yet enables easily identifying counterfeit items by printing plural items of information in visible ink as well as specialty inks such as fluorescent ink and infrared absorbing ink.

A problem with the receipt printer taught in JP-A-2002-326443, however, is that while it can effectively suppress counterfeit receipts when applied to a receipt printer used for issuing receipts, acquiring possession of the receipt printer makes counterfeiting possible. Making the production of counterfeit receipts difficult even when in possession of the receipt printer is therefore desirable. This can conceivably also eliminate receipt counterfeiters, and thereby effectively prevent counterfeit receipts.

SUMMARY

A receipt printer, a control method for a receipt printer, and a program according to the present invention can make producing counterfeit printouts impossible.

A first aspect of the invention is a receipt printer having a storage unit that stores encrypted information obtained by encrypting registered information; a specific information acquisition unit that acquires specific information from an external source; a comparison unit that compares the specific information with the registered information decrypted from the encrypted information; a printing permission unit that permits printing when the comparison unit verifies a data match; and a printing unit that prints when printing is permitted by the printing permission unit.

A control method for a receipt printer according to another aspect of the invention is a control method for a receipt printer having a storage unit that stores encrypted information obtained by encrypting registered information, the control method including as steps executed by the receipt printer: a step of acquiring specific information from an external source; a step of reading the encrypted information from the storage unit and decrypting the encrypted information; a step of comparing the acquired specific information and the decrypted registered information; and a step of permitting printing when a data match is confirmed.

Because these aspects of the invention compare specific information acquired from an external source with previously stored registered information, and permit printing only if a data match is confirmed, a person attempting to produce counterfeit printout will not be able to print even if in possession of the receipt printer unless the specific information can also be acquired. Producing counterfeit printout can therefore be prevented. In addition, because the registered information is encrypted and stored as encrypted information, restoring the registered information is difficult even if the encrypted information can be read from the storage unit, discovering the specific information is therefore difficult, and the forgery prevention effect of the invention is further enhanced.

The specific information and the registered information are also not limited to being the same information. For example, a data match may be confirmed if the registered information is included in the specific information, or, conversely, if the specific information is contained in the registered information. Each could also be one of a plurality of values. For example, if there are plural registered information and plural specific information values, a data match may be confirmed if a specified number of the plural specific information values matches any one of the plural registered information values. A data match may also be confirmed if all of the plural specific information values match all of the plural registered information values. A data match may also be confirmed based on whether or not the content, form, and type of information matches.

Further preferably in a receipt printer according to another aspect of the invention, the specific information acquisition unit acquires specific information contained in transaction information acquired from a POS terminal as an external source; and the printing unit prints the transaction information when printing is permitted by the printing permission unit.

With this aspect of the invention the transaction information can be printed conditionally upon a match being confirmed between specific information contained in the transaction information and the registered information. For example, text data representing the store ID or register ID can conceivably be acquired as the specific information (that is, extracted from the transaction information) when the transaction information is for printing a receipt. Printing is therefore not possible even if a receipt printer is acquired unless the POS (point of sale) terminal, which is a host computer, can also be acquired, and producing a counterfeit receipt is thus not possible.

Further preferably in a receipt printer according to another aspect of the invention, the specific information acquisition unit acquires the specific information by reading a specific recording medium as the external source.

This aspect of the invention can permit printing on the condition that specific information read from a specific recording medium matches the registered information. More specifically, printing is not possible even if in possession of the receipt printer unless the specific recording medium is also acquired, and producing counterfeit printout can therefore be prevented.

Examples of the specific recording medium include magnetic cards, IC cards, and printed media on which a specific code is printed.

A receipt printer according to another aspect of the invention includes a storage unit that stores registered information; a reading unit that reads a specific recording medium to which first specific information is recorded; a first comparison unit that compares the first specific information and the registered information; a mode setting unit that when the first comparison unit verifies a data match activates a printing enabled mode permitting printing; a transaction information acquisition unit that acquires transaction information contained in second specific information from a POS terminal; a second comparison unit that compares the second specific information and the registered information; a printing permission unit that permits printing when the printing enabled mode is active and the second comparison unit confirms a data match; and a printing unit that prints the transaction information when printing is permitted by the printing permission unit.

A control method for a receipt printer according to another aspect of the invention is a control method for a receipt printer having a storage unit that stores registered information, the control method including as steps executed by the receipt printer: a step of reading a specific recording medium to which first specific information is recorded; a step of comparing the read first specific information and registered information read from the storage unit; a step of setting a printing mode to a printing enabled mode permitting printing when a data match between the first specific information and the registered information is confirmed; a step of acquiring transaction information containing second specific information from a POS terminal; a step of comparing the acquired second specific information and the registered information read from the storage unit; a step of permitting printing when the printing enabled mode is active and a data match between the second specific information and the registered information is confirmed; and a step of printing the transaction information when printing is permitted.

These aspects of the invention test two conditions, comparing first specific information that can be acquired from a specific recording medium with registered information, and comparing second specific information contained in transaction information with registered information, and prints the transaction information when a data match is confirmed by both comparisons. More specifically, producing counterfeit printout is made even more difficult even if in possession of a receipt printer because printing is not possible unless both a POS terminal, which is a host computer, and the specific recording medium can be acquired.

Note that the same variations described above can be applied to comparing the first specific information, second specific information, and registered information.

Further preferably in a receipt printer according to another aspect of the invention, the storage unit stores encrypted information obtained by encrypting the registered information; and the first comparison unit and second comparison unit use the registered information decrypted from the encrypted information for comparison.

Because the registered information is encrypted and stored as encrypted information in this embodiment of the invention, restoring the registered information is difficult even if the encrypted information can be read from the storage unit, discovering the first specific information and the second specific information is therefore difficult, and the forgery prevention effect of the invention is further enhanced.

Yet further preferably in a receipt printer according to another aspect of the invention, the printing unit prints registered information or encrypted information together with the transaction information.

Because these aspects of the invention print the registered information or encrypted information, the authenticity of the printout (receipt) can be determined by also reading this information. Furthermore, because the registered information or encrypted information is also printed, customers will know that some counterfeiting prevention measure is used, and a deterrent effect inhibiting someone from attempting to create a counterfeit receipt can be expected.

Note that the registered information or encrypted information may be printed in an encoded form (such as a linear or two-dimensional barcode).

Yet further preferably in a receipt printer according to another aspect of the invention, the mode setting unit activates, in conjunction with receipt printer power turning off, a printing disabled mode that does not permit printing.

This aspect of the invention switches to the printing disabled mode when the printer power turns off even if the receipt printer was set to the printing enabled mode, and can therefore prevent production of counterfeit printout even if both a receipt printer and POS terminal are stolen.

Yet further preferably, a receipt printer according to another aspect of the invention also has a switching signal acquisition unit that acquires from the POS terminal a switching signal for switching to a printing disabled mode that does not permit printing, and the mode setting unit activating the printing disabled mode when the switching signal is received.

This aspect of the invention enables switching to the printing disabled mode if the switching signal is sent from the POS terminal when the receipt printer is in the printing enabled mode. As a result, the printing disabled mode can be activated when the cash register clerk is temporarily away from the register, and production of counterfeit printout when the cash register clerk is absent can be prevented.

The POS terminal further preferably cannot send a switching signal for switching from the printing disabled mode to the printing enabled mode. This configuration makes switching to the printing enabled mode difficult even if a person well-trained in using the POS terminal steals both the receipt printer and POS terminal.

The switching signal may be sent from the POS terminal when the cash register clerk, for example, performs a specific operation on the POS terminal, or when POS terminal power turns off.

Yet further preferably, a receipt printer according to another aspect of the invention also has a positioning information acquisition unit that acquires positioning information indicating an installation position of the receipt printer, and the printing unit prints the positioning information together with the transaction information.

Because location information is printed with the transaction information in this aspect of the invention, the authenticity of the printout (receipt) can be determined by reading the positioning information. For example, by acquiring GPS information from a GPS (Global Positioning System) satellite as the positioning information, the GPS information can be compared with the actual store location and the authenticity of the printout (whether or not the printout is counterfeit) can be determined from the result.

Note, further, that the positioning information may be printed in an encoded form similarly to the encrypted information.

Another aspect of the invention is a program that causes a computer to execute the steps of a receipt printer control method described above.

A receipt printer control method that makes producing counterfeit printout not possible can be achieved by executing this program.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. The following embodiments describe the invention applied to a receipt printer.

Embodiment 1

Figure 1:
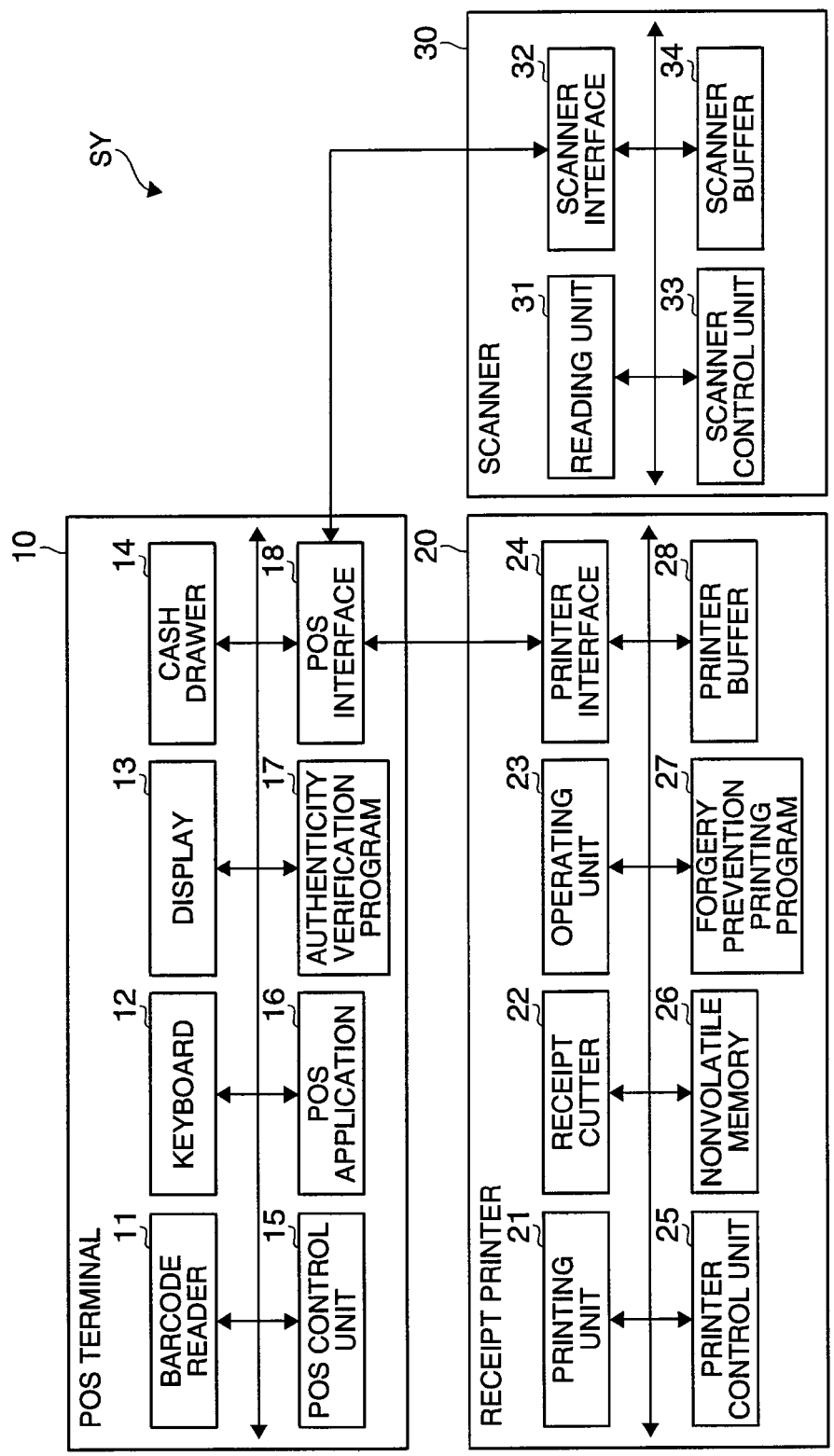
FIG. 1 is a control block diagram of a receipt issuing system according to a first embodiment of the invention.

FIG. 1 is a control block diagram of a receipt issuing system SY according to a first embodiment of the invention. The receipt issuing system SY according to this embodiment of the invention includes a POS terminal 10 (host computer) that executes a sales transaction process, a receipt printer 20 that issues a sales receipt R (referred to below as simply a receipt R), and a scanner 30 that reads information printed on the receipt R.

The POS terminal 10 includes a barcode reader 11 that reads barcodes printed on or applied to products, a keyboard 12 for entering product codes and other information, a display 13 for displaying product prices, transaction totals, and other information, a cash drawer 14 that stores cash and coins, a POS control unit 15 composed of primarily a CPU (central processing unit) and centrally controlling the POS terminal 10, a POS application 16 that executes a transaction process, an authenticity verification program 17 for determining the authenticity of a receipt R, a receipt printer 20, a scanner 30, and a POS interface 18 to which these are connected by a cable or other means.

The authenticity verification program 17 is a program for determining the authenticity of a receipt R (determines if the receipt R was issued officially or was forged) based on a barcode 46 printed on the receipt R. The authenticity verification program 17 is further described in detail below.

The receipt printer 20 includes a printing unit 21 that prints sales transaction information, which is the result of a transaction process run by the POS terminal 10, on receipt paper; a receipt cutter 22 that cuts the printed portion of the receipt paper across the width; an operating unit 23 for performing such operations as turning the power on and off; a printer interface 24 that is connected to the POS terminal 10 through a cable or other means; a printer control unit 25 that centrally controls the receipt printer 20; nonvolatile memory 26 that stores information nonvolatilely; a forgery prevention printing program 27 that is incorporated to allow printing under certain conditions for the purpose of preventing counterfeiting; and a printer buffer 28 that temporarily stores print data for printing a receipt R.

The printing unit 21 prints by means of inkjet printing, thermal printing, dot impact printing, thermal transfer printing, or other printing method.

Information including a store ID identifying the store in which the receipt issuing system SY is deployed, a register ID uniquely identifying a POS terminal 10, and an employee ID (cash register clerk ID) identifying the employee working as the cash register clerk in the store, are encrypted and stored (as encrypted data) in the nonvolatile memory 26.

The forgery prevention printing program 27 allows printing when specific information (three text values denoting the store ID, register ID, and clerk ID) contained in the transaction information acquired from the POS terminal 10 completely matches registered information stored in the nonvolatile memory 26. However, if the clerk ID matches the ID value of plural employees stored as the registered value, the ID is considered to match. The forgery prevention printing program 27 also adds the barcode 46 (see FIG. 2) to the transaction information generated by the POS terminal 10 when printing.

Figure 2:
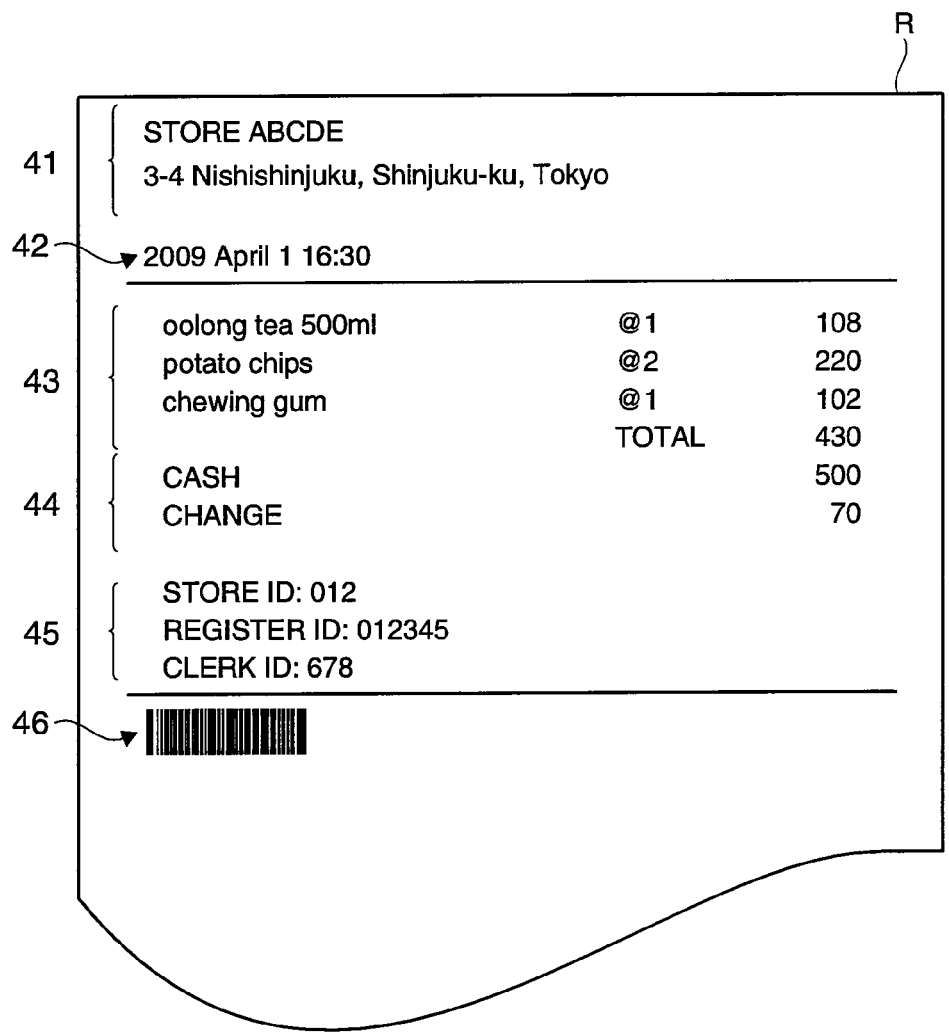
FIG. 2 shows an example of a printed receipt in a first embodiment of the invention.

The items printed on a receipt R are described next with reference to FIG. 2. As shown in the figure, store information 41, transaction date and time information 42, product information 43, payment information 44, ID information 45, and a barcode 46 are printed on the receipt R. Except for the barcode 46, these items are based on the transaction information acquired from the POS terminal 10. The barcode 46 encodes at least part (such as the store ID and register ID) of the foregoing encrypted information (the encrypted store ID, register ID, or clerk ID, for example).

Referring again to FIG. 1, the scanner 30 includes a reading unit 31 that reads information printed on the receipt R (transaction information 41 to 45 and barcode 46), a scanner interface 32 connected to the POS terminal 10 through a cable or other means, a scanner control unit 33 that centrally controls the scanner 30, and a scanner buffer 34 that temporarily stores the data read by the reading unit 31.

The reading unit 31 can be rendered using a common scanner, and any type of light source (LED, laser, or other) may be used. The reading unit 31 may also read the barcode 46.

A method of determining the authenticity of a receipt R is described briefly next. The scanner control unit 33 first sends the result of reading by the reading unit 31 to the POS terminal 10 through the scanner interface 32.

When the POS terminal 10 receives the reading result through the POS interface 18, the POS control unit 15 decrypts the encrypted information obtained from the code that was read and detects forgeries based on the decrypted information obtained by the authenticity verification program 17. More specifically, forgeries are detected based on whether or not the store ID, register ID, and clerk ID, for example, are actual existing values. As an alternative verification method, forgeries may be detected based on a match between the ID information 45 contained in the transaction information obtained from the reading result and information obtained by decryption. The result of forgery detection by the POS control unit 15 is also displayed on the display 13. Instead of displaying only the result of forgery detection, the decrypted information is also preferably displayed on the display 13 at the same time.

Figure 3:
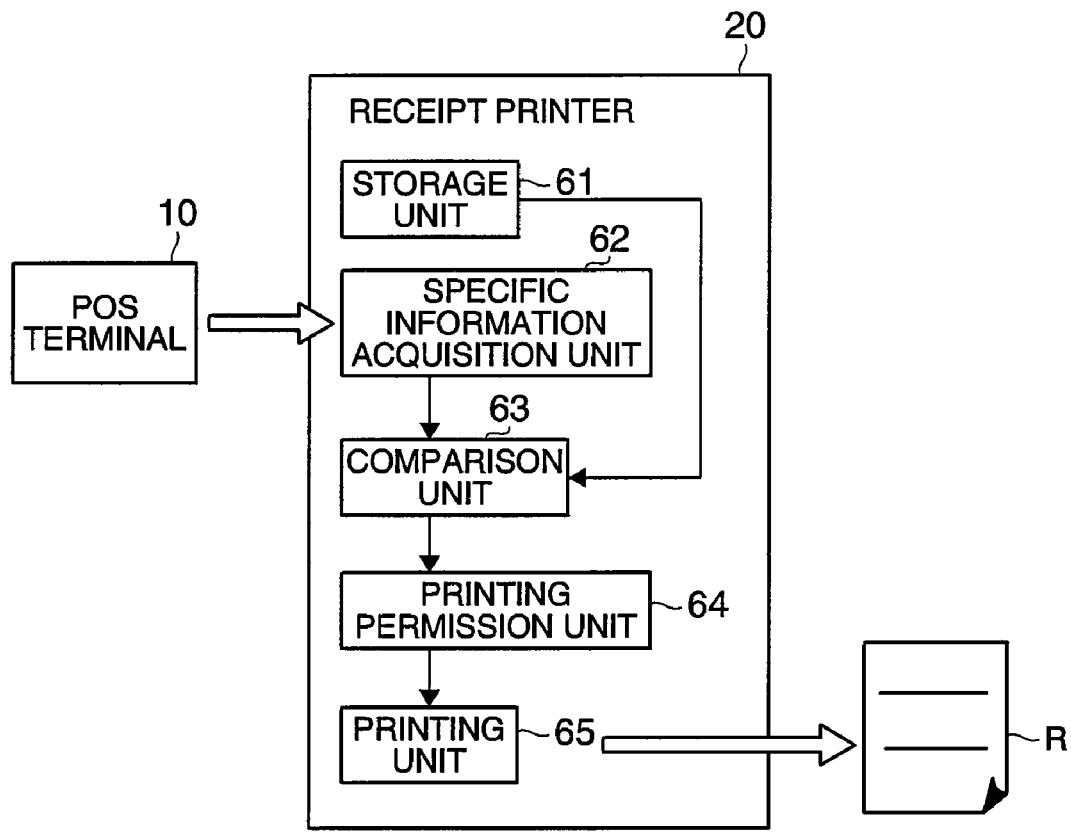
FIG. 3 is a function block diagram of a receipt printer according to a first embodiment of the invention.

The functional configuration of the receipt printer 20 according to a first embodiment of the invention is described next with reference to FIG. 3. This receipt printer 20 is primarily composed of a storage unit 61, a specific information acquisition unit 62, a comparison unit 63, a printing permission unit 64, and a printing unit 65.

The storage unit 61 stores the registered information as encrypted information, and is rendered mainly by the nonvolatile memory 26.

The specific information acquisition unit 62 acquires specific information contained in the transaction information acquired from the POS terminal 10. More specifically, the printer control unit 25 extracts specific information such as the store ID by means of a search command from the acquired transaction information. Note that this extraction process is based on the forgery prevention printing program 27.

The comparison unit 63 compares the specific information and the registered information based on the forgery prevention printing program 27 by means of the printer control unit 25. At this time the printer control unit 25 reads and decrypts the encrypted information from the storage unit 61, and compares the decrypted registered information and specific information. More specifically, a decryption program is also included in the forgery prevention printing program 27. Note that the comparison unit 63 makes this comparison every time transaction information is acquired.

If the comparison unit 63 confirms a match, the printing permission unit 64 permits printing by means of the printer control unit 25. Note that if the comparison unit 63 does not confirm a match, the printer control unit 25 discards the print data in the printer buffer 28 and does not print. Note that an error may be reported at this time by sounding a buzzer or driving an LED.

If the printing permission unit 64 allows printing, the printing unit 65 prints by means of the printing unit 21. At this time the printer control unit 25 generates print data adding a barcode 46 to the acquired transaction information 41 to 45, and stores the print data in the printer buffer 28. Note, further, that after the printing unit 21 finishes printing, the printing unit 65 cuts the receipt paper by means of the receipt cutter 22 and a receipt R is issued.

Figure 4:
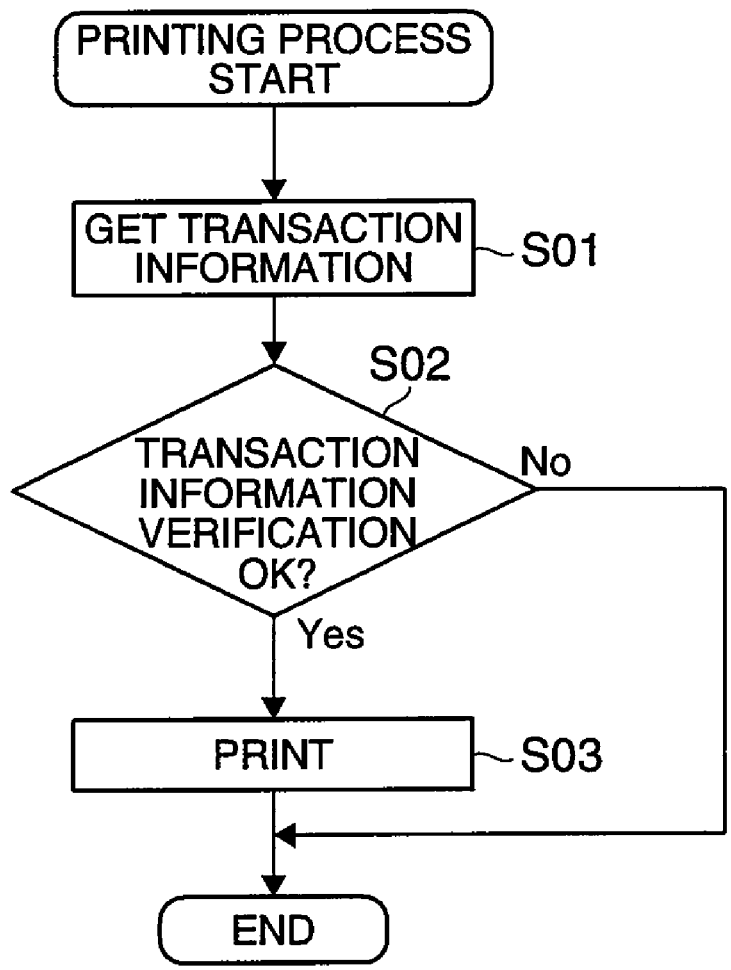
FIG. 4 is a flow chart showing the printing process of a receipt printer according to a first embodiment of the invention.

The printing process of the receipt printer 20 according to the first embodiment of the invention is described next with reference to the flow chart in FIG. 4.

When transaction information is acquired from the POS terminal 10 (S01), the receipt printer 20 (printer control unit 25) compares specific information contained in the transaction information with the registered information obtained by decrypting the encrypted information (S02). If a match is confirmed (S02 returns Yes), the printer control unit 25 prints by means of the printing unit 65 (S03). If a match is not confirmed (S02 returns No), the printing process ends without printing.

As described above, because this first embodiment of the invention compares specific information contained in the transaction information acquired from the POS terminal 10 with previously stored registered information, and permits printing when a match is confirmed, a person planning to counterfeit receipts is unable to print even when in possession of the receipt printer 20 unless the specific information can be acquired (that is, unless also in possession of the POS terminal 10). Production of counterfeit receipts can therefore be prevented. Furthermore, even if the information stored in the nonvolatile memory 26 can be read, recovering the registered information from the read information is difficult because the registered information is stored in an encrypted form. This further enhances the counterfeit prevention effect of the invention.

Yet further, existing POS terminals 10 can be used because a counterfeiting prevention function can be rendered by the receipt printer 20. As a result, because modifying the POS terminal 10 is not necessary, the initial cost required to introduce a counterfeiting prevention function can be reduced.

Note, further, that while the specific information and registered information are compared in this embodiment by determining if particular identification information, such as the store ID, matches, a match is not necessarily required. For example, a match may be confirmed if the registered information is contained in the specific information, or, conversely, if the specific information is contained in the registered information.

Yet further, a match is confirmed in the foregoing embodiment when three text values denoting the store ID, register ID, and clerk ID used as the specific information all match the corresponding values in the registered information, but a match may alternatively be confirmed when any one or any two or more of these values match.

The match conditions may also change according to the content of the transaction information (such as the total sale amount or other product information). More specifically, a configuration that confirms a match only if there is a complete match between the specific information and the registered information when the transaction total equals or exceeds a specific amount, but confirms a match when there is a partial match between the specific information and the registered information when the transaction total is less than a specified amount, is also conceivable.

A comparison based on the content, format, or type of specific information and registered information, for example, is also conceivable. For example, if the registered information is text data and the specific information is base-n data, whether or not both values indicate the same content may be determined, whether or not the number of characters in the registered information matches the number of characters in the specific information may be determined, or whether or not the character type, font, or attributes of the registered information and the specific information match may be compared.

Furthermore, the POS terminal 10 determines authenticity in the embodiment described above, but a configuration in which the receipt printer 20 determines the authenticity of the receipt R is also conceivable. More specifically, operations from reading information to determining authenticity may be executed on the scanner 30 side. In this situation a display unit for displaying the result of the authenticity decision is preferably disposed to the scanner 30. Further alternatively, instead of disposing a display unit to the scanner 30, the scanner 30 may send the result of the authenticity decision to the POS terminal 10 and the result of the authenticity decision may be displayed on the display 13 of the POS terminal 10.

Furthermore, the registered information is stored in an encrypted form in the nonvolatile memory 26 in the foregoing embodiment, but the registered information may be stored without encryption.

Yet further, encrypted information is printed on the receipt R as a barcode 46 in the foregoing embodiment, but registered information that is not encrypted (the decrypted registered information if the registered information is stored encrypted in the nonvolatile memory 26) may be printed on the receipt R as a barcode 46 or regular text.

Embodiment 2

A second embodiment of the invention is described next with reference to FIG. 5 to FIG. 8. In the first embodiment described above specific information contained in the transaction information acquired from the POS terminal 10 is compared with registered information. This embodiment differs in that it compares specific information read from a specific recording medium (an IC card 50, shown in FIG. 6) with the registered information. Only the differences between this and the first embodiment are described below.

Note, further, that like parts in this and the first embodiment are identified by the same reference numerals, and further detailed description thereof is omitted. In addition, variations that can be applied to like parts in the first embodiment can also be applied in this embodiment.

Figure 5:
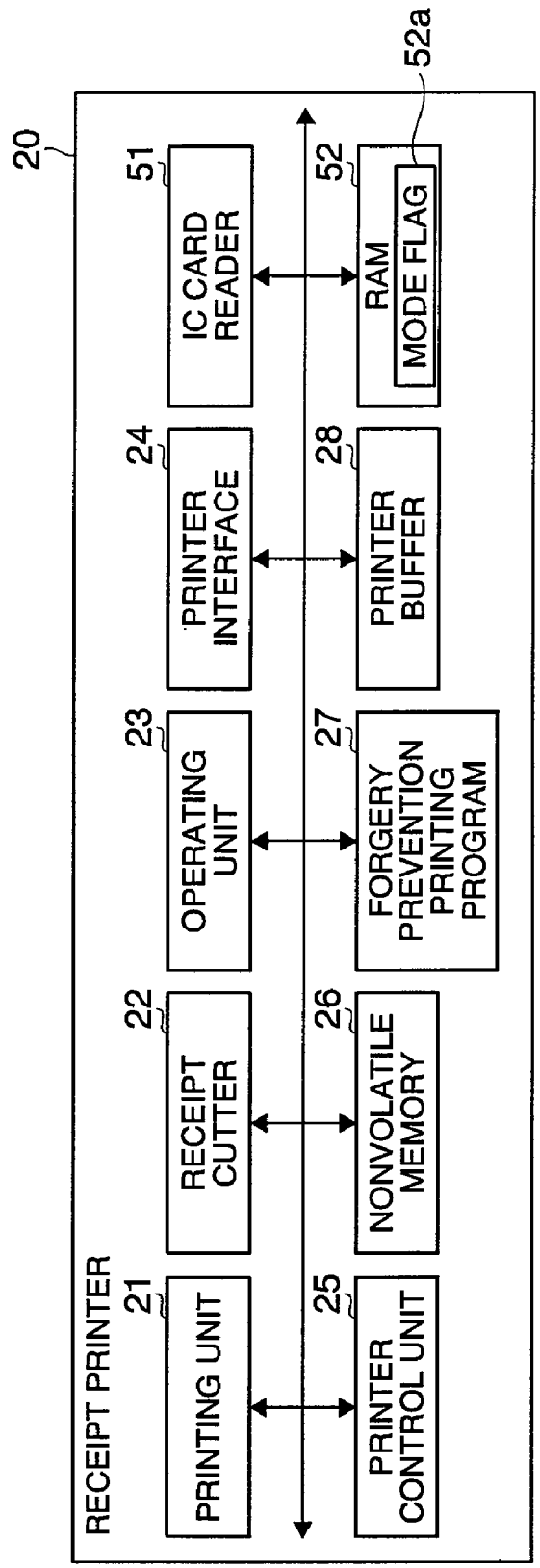
FIG. 5 is a control block diagram of a receipt printer according to a second embodiment of the invention.

FIG. 5 is a control block diagram of the receipt printer 20 in this second embodiment of the invention. The receipt printer 20 in this embodiment adds an IC card reader 51 and RAM (random access memory) 52 to the control configuration of the first embodiment (shown in FIG. 1).

The IC card reader 51 reads the IC card 50 in which the specific information is recorded. Employee ID cards that are distributed to individual employees may be used as the IC card 50.

A mode flag 52a indicating the printing mode is also stored in RAM 52. When the mode flag 52a is set to 1, the printing enabled mode is active and printing is allowed. When the mode flag 52a is set to 0, the printing disabled mode is active and printing is not allowed.

Figure 6:
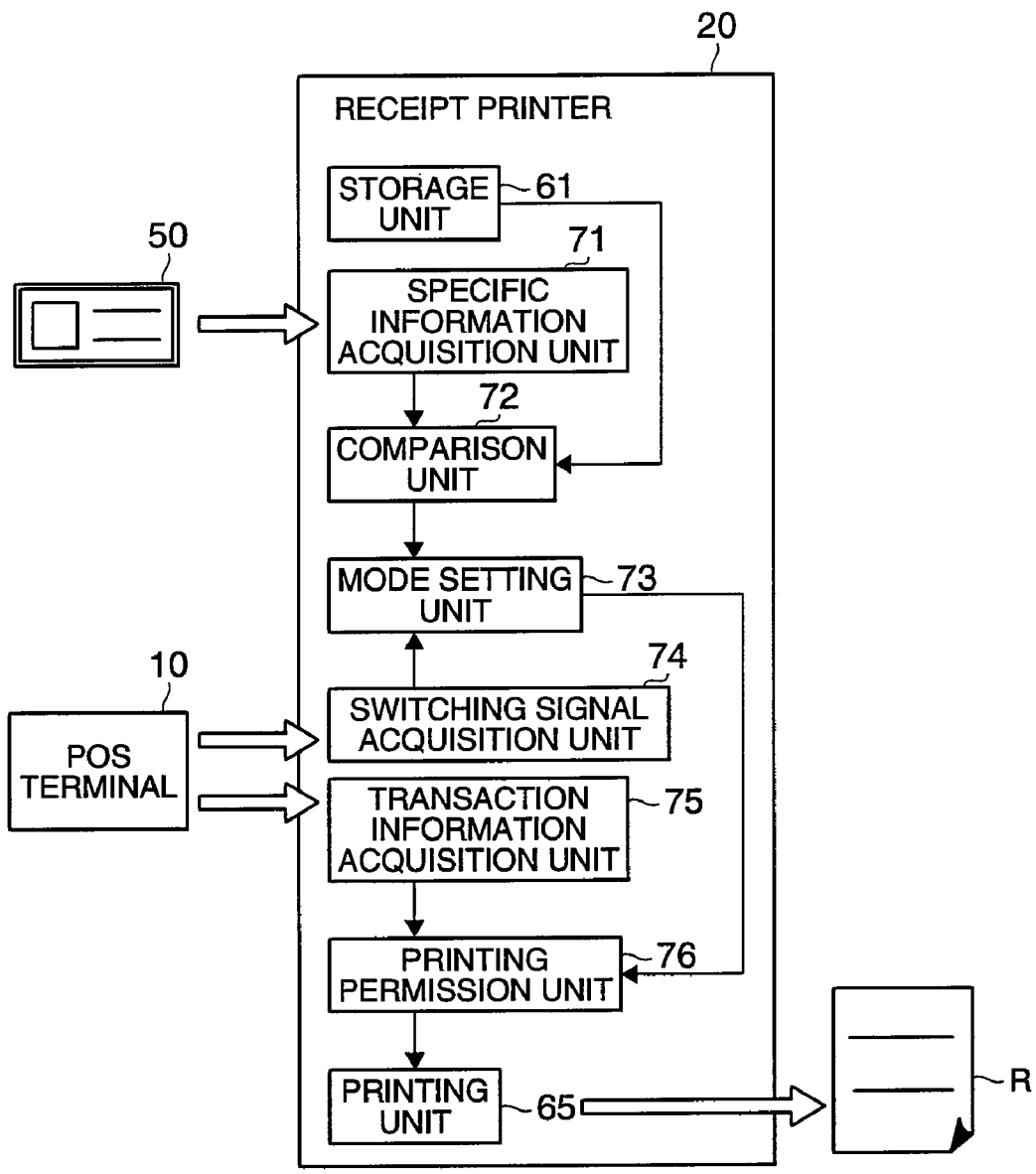
FIG. 6 is a function block diagram of a receipt printer according to a second embodiment of the invention.

FIG. 6 is a function block diagram of the receipt printer 20 in this second embodiment of the invention. The main components of the receipt printer 20 in this embodiment of the invention include a storage unit 61, a specific information acquisition unit 71, a comparison unit 72, a mode setting unit 73, a switching signal acquisition unit 74, a transaction information acquisition unit 75, a printing permission unit 76, and a printing unit 65.

As in the first embodiment, the storage unit 61 stores encrypted information containing the registered information in an encrypted form.

The specific information acquisition unit 71 acquires specific information (such as the store ID) as a result of the IC card reader 51 reading the IC card 50.

The comparison unit 72 compares the acquired specific information and the decrypted registered information by means of the printer control unit 25 executing the forgery prevention printing program 27. Note that the comparison unit 72 executes this comparison when the power is turned on and when the IC card 50 is read.

The mode setting unit 73 sets the printing mode to the printing enabled mode or the printing disabled mode by means of the printer control unit 25. For example, if the comparison unit 72 confirms a match, the mode setting unit 73 sets the printing mode to the printing enabled mode (activates the printing enabled mode by setting the mode flag 52a to 1). If the power is turned off by operating the power switch on the operating unit 23, the printing mode is set to the printing disabled mode (the printing enabled mode is deactivated by setting the mode flag 52a to 0). The printing mode is also set to the printing disabled mode when the switching signal acquisition unit 74 described below acquires a switching signal.

The switching signal acquisition unit 74 acquires a switching signal from the POS terminal 10 by means of the printer interface 24. When the cash register clerk performs a specific operation (such as an operation deactivating the POS terminal 10), or the POS terminal 10 power is turned off, the POS terminal 10 sends a switching signal to the receipt printer 20.

Note that this switching signal is a signal for switching from the printing enabled mode to the printing disabled mode, and cannot switch from the printing disabled mode to the printing enabled mode. As a result, even if a person knowledgeable in the use of the POS terminal 10 steals both a POS terminal 10 and a receipt printer 20, switching to the printing enabled mode is difficult and the production of counterfeit receipts can therefore be prevented.

The transaction information acquisition unit 75 acquires transaction information from the POS terminal 10 through the printer interface 24.

The printing permission unit 76 enables printing by means of the printer control unit 25 according to the setting of the mode setting unit 73. More specifically, printing is allowed when in the printing enabled mode, and printing is not allowed when in the printing disabled mode.

The printing unit 65 can print when printing is permitted by the printing permission unit 76 (that is, when the printing enabled mode is activated by the mode setting unit 73).

Figure 7:
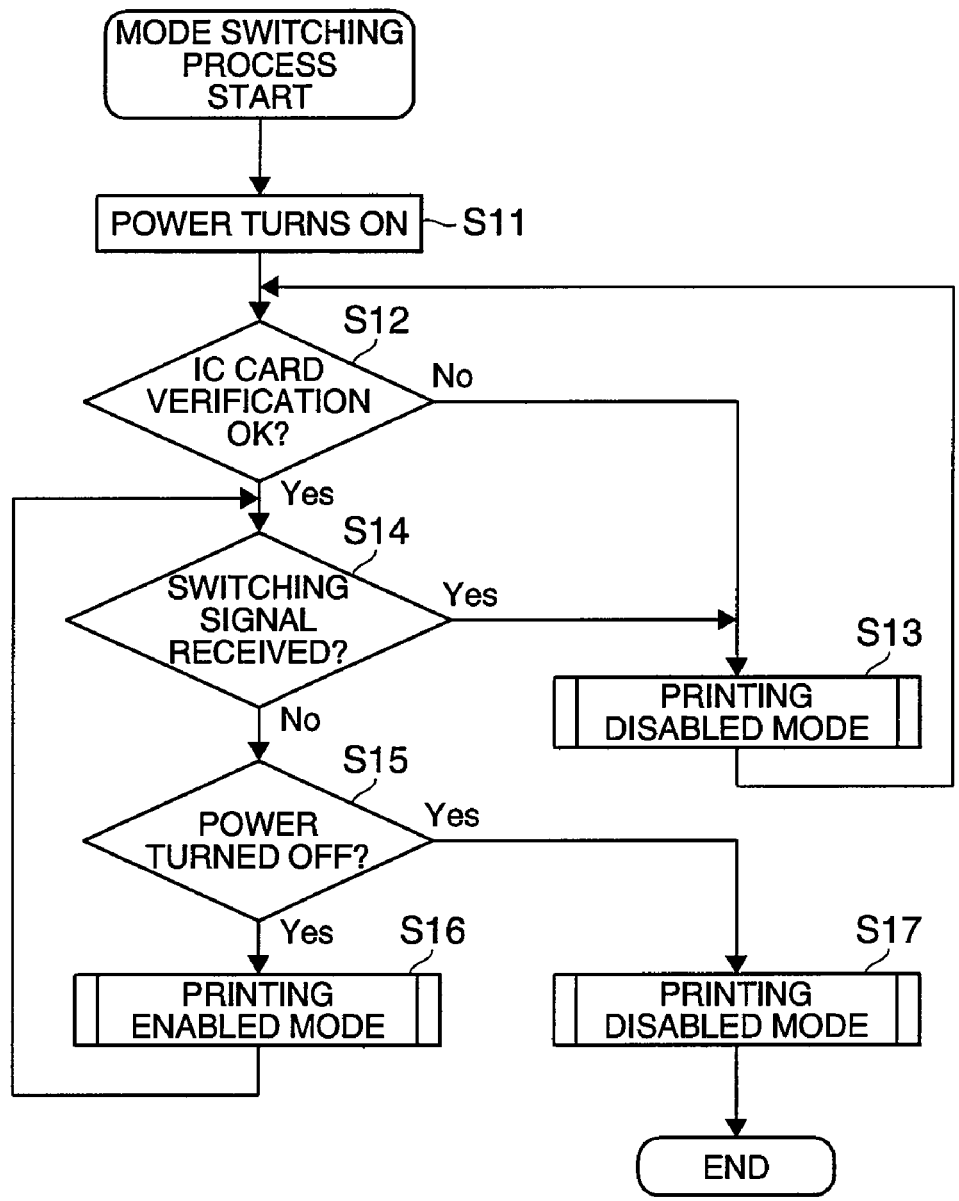
FIG. 7 is a flow chart of the mode switching process of a receipt printer according to a second embodiment of the invention.

FIG. 7 is a flow chart of the mode switching process executed by the receipt printer 20 according to the second embodiment of the invention.

After the power turns on (S11), the receipt printer 20 (printer control unit 25, mode setting unit 73) reads the IC card 50 by means of the IC card reader 51, and compares the specific information that was read with the registered information decrypted from the encrypted information (S12). If a match is not confirmed (S12 returns No), the printing disabled mode is set (S13) and control returns to S12.

If a match is confirmed (S12 returns Yes) but a switching signal was received from the POS terminal 10 (S14 returns Yes), the printing disabled mode is set (S13), and control returns to S12.

If a switching signal is not acquired from the POS terminal 10 (S14 returns No) but the power was turned off (S15 returns Yes), the printing disabled mode is set (S17) and the process ends.

If the power is not turned off (S15 returns No), the printing enabled mode is set (S16) and control returns to S14.

Figure 8:
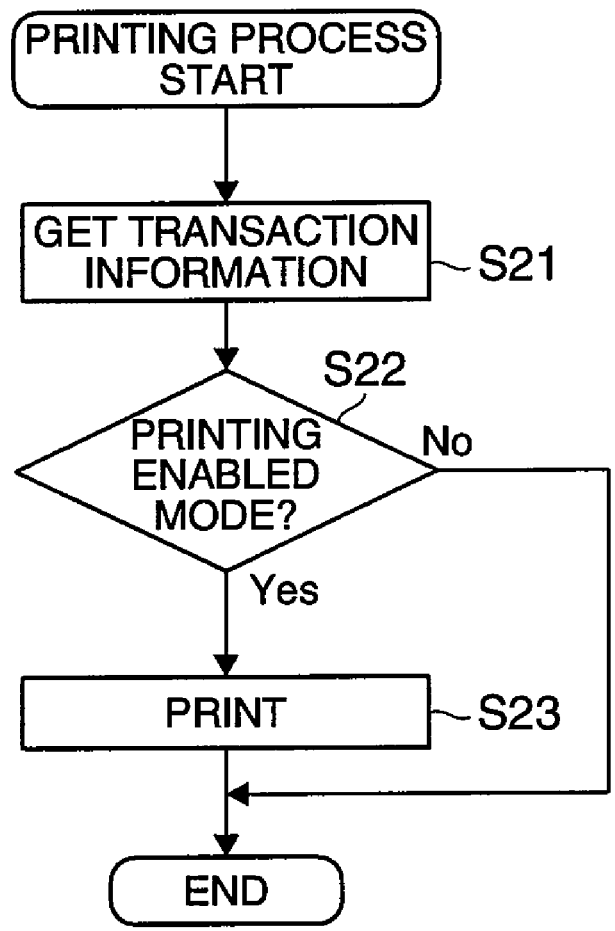
FIG. 8 is a flow chart of the printing process of a receipt printer according to a second embodiment of the invention.

FIG. 8 is a flow chart of the printing process of the receipt printer 20 according to the second embodiment of the invention.

When transaction information is acquired from the POS terminal 10 (S21), the receipt printer 20 (printer control unit 25) determines if the printing enabled mode is active (S22). If the printing enabled mode is active (S22 returns Yes), the receipt printer 20 prints (S23).

If the printing disabled mode is set (S22 returns No), the printing process ends without printing.

As described above, because this second embodiment of the invention allows printing on the condition that the specific information read from the IC card 50 matches the registered information decrypted from the storage unit 61, a person planning to counterfeit receipts is unable to print even when in possession of the receipt printer 20 unless also in possession of an IC card 50. Production of counterfeit receipts can therefore be prevented.

Furthermore, because the printing disabled mode is set when the receipt printer 20 power turns off even if the printing enabled mode was active, production of counterfeit receipts can be prevented even if both the POS terminal 10 and the receipt printer 20 are stolen.

Yet further, because the printing disabled mode is set when a switching signal is received from the POS terminal 10, the receipt printer 20 can switch to the printing disabled mode when the cash register clerk is temporarily away from the register. A person planning to forge a receipt can therefore be prevented from printing a counterfeit receipt while the clerk is away from the cash register.

Furthermore, while an IC card is used as an example of a "specific recording medium" to which the specific information is recorded in the embodiment described above, other media such as a magnetic card or a printed medium on which a specific code is printed may be used instead.

The IC card reader 51 reads the IC card 50 after the power is turned on in the process shown in the flow chart in FIG. 7. Alternatively, however, the IC card 50 may be read by the IC card reader 51 and the printing mode may be switched according to the result (the comparison result) each time transaction information is acquired. In this configuration the IC card 50 is preferably placed on the IC card reader 51 so that the IC card 50 can be read by the IC card reader 51 at any time. Note that the IC card 50 may be inserted if an IC card reader 51 with a card slot is used, and if a contactless IC card reader 51 is used, the IC card 50 may be simply placed within reading distance.

As a countermeasure to all three components, the POS terminal 10, the receipt printer 20, and the IC card 50, being stolen, specific information (unique information such as the clerk ID stored in the IC card 50) captured when the printing enabled mode is set may also be printed on the receipt R. This configuration enables identifying which IC card 50 was stolen and this information may be used to find the criminal. Note, further, that specific information acquired when the printing enabled mode is set may also be encrypted or encoded and printed on the receipt R.

Embodiment 3

A third embodiment of the invention is described next with reference to FIG. 9 and FIG. 10. This embodiment of the invention combines the foregoing first and second embodiments to further enhance the counterfeiting prevention effect. The differences between the embodiments are described below.

Note, further, that like parts in this and the first embodiment are identified by the same reference numerals, and further detailed description thereof is omitted. In addition, variations that can be applied to like parts in the first embodiment can also be applied in this embodiment.

Figure 9:
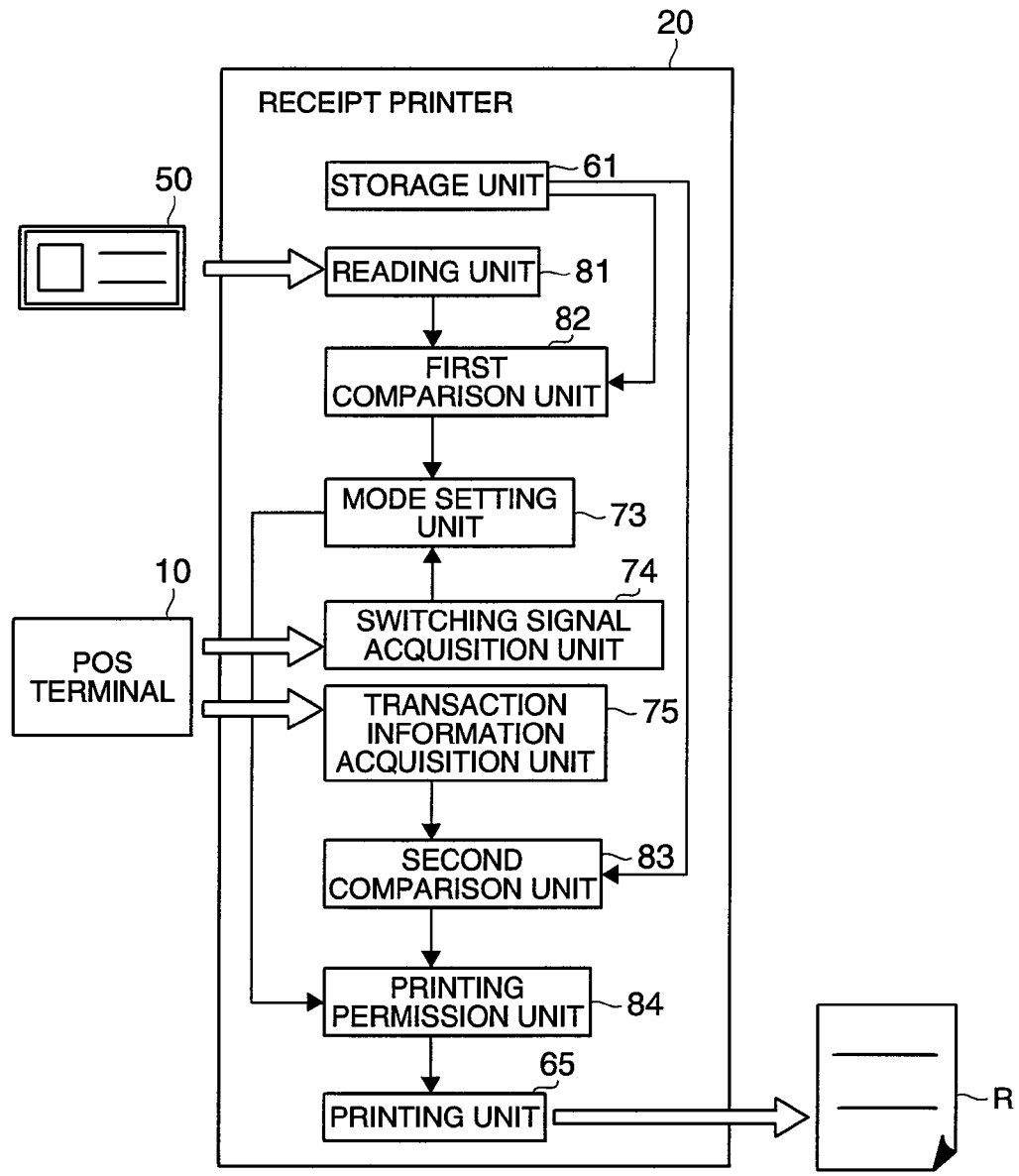
FIG. 9 is a function block diagram of a receipt printer according to a third embodiment of the invention.

FIG. 9 is a function block diagram of a receipt printer 20 according to the third embodiment of the invention. The main components of the receipt printer 20 in this embodiment of the invention include a storage unit 61, a reading unit 81, a first comparison unit 82, a mode setting unit 73, a switching signal acquisition unit 74, a transaction information acquisition unit 75, a second comparison unit 83, a printing permission unit 84, and a printing unit 65.

Note that the storage unit 61, mode setting unit 73, switching signal acquisition unit 74, transaction information acquisition unit 75, and printing unit 65 function the same as described in the foregoing embodiments, and further description thereof is thus omitted. The control configuration of the receipt printer 20 in this embodiment is also the same as the configuration of the second embodiment shown in FIG. 5.

The reading unit 81 reads an IC card 50 by means of the IC card reader 51, and acquires specific information (first specific information, such as the store ID). The reading unit 81 thus functions identically to the specific information acquisition unit 71 in the second embodiment.

The first comparison unit 82 compares the specific information read from the IC card 50 with the decrypted registered information from the storage unit 61 based on the printer control unit 25 executing the forgery prevention printing program 27. The first comparison unit 82 thus functions identically to the comparison unit 72 in the second embodiment.

The second comparison unit 83 compares specific information (second specific information, such as the store ID) contained in the transaction information acquired from the POS terminal 10 with the decrypted registered information from the storage unit 61 by means of the printer control unit 25 executing the forgery prevention printing program 27. The second comparison unit 83 thus functions identically to the comparison unit 63 in the first embodiment.

The printing permission unit 84 permits printing by means of the printer control unit 25 when the printing enabled mode is set and a match is confirmed by the second comparison unit 83. More specifically, printing is permitted when the printing enabled mode is activated by the mode setting unit 73 and the specific information contained in the transaction information matches the registered information.

Figure 10:
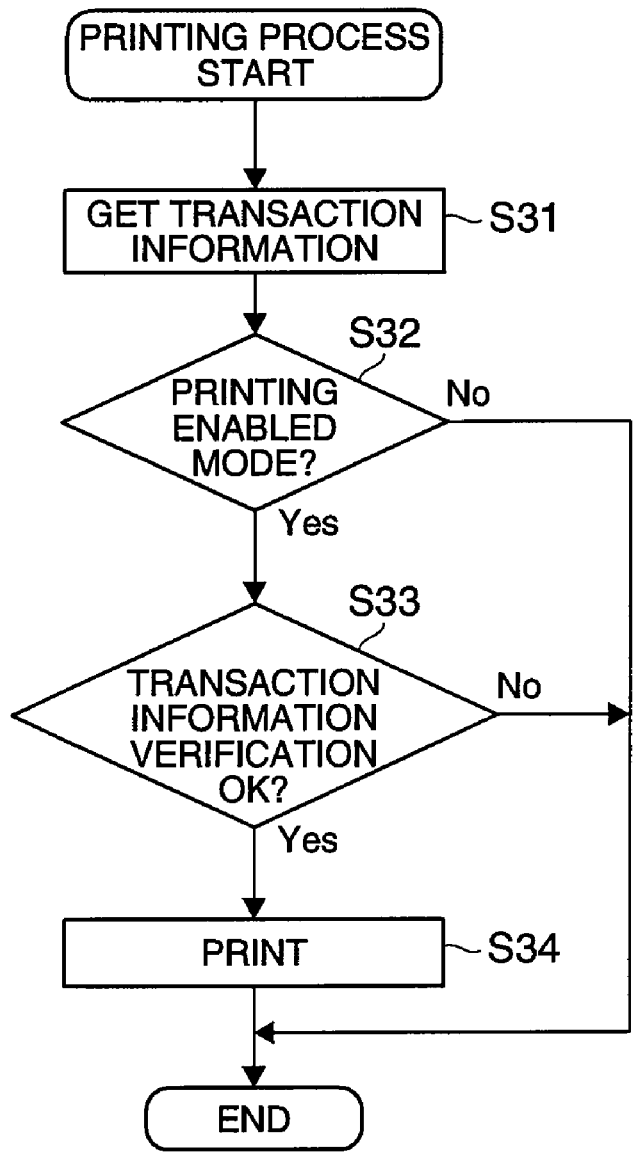
FIG. 10 is a flow chart of the printing process of the receipt printer according to a third embodiment of the invention.

FIG. 10 is a flow chart of the printing process executed by the receipt printer 20 in the third embodiment of the invention.

When transaction information is acquired from the POS terminal 10 (S31), the receipt printer 20 (printer control unit 25) first determines if the printing enabled mode is active (S32). If the printing enabled mode is set (S32 returns Yes), the receipt printer 20 compares the specific information contained in the transaction information with the registered information (S33). If a match is confirmed (S33 returns Yes), the printer prints (S34). If the printing enabled mode is not active (S32 returns No), or if a match based on the transaction information is not confirmed (S33 returns No), the printing process ends without printing.

As described above, the third embodiment of the invention performs two tests, comparing the specific information read from the IC card 50 with the registered information, and comparing specific information contained in the transaction information with the registered information, and issues a receipt R if a match is confirmed by both tests. With this embodiment of the invention a person intending to forge a receipt cannot print even if a receipt printer 20 is acquired unless both the POS terminal 10 and IC card 50 are also acquired. Producing counterfeit receipts can therefore be effectively prevented.

Note that in the foregoing embodiment the specific information (first specific information) read from the IC card 50 and the specific information (second specific information) contained in the transaction information are both identification information, such as the store ID, but they may be different. For example, the first specific information may be a clerk ID and the second specific information may be the store ID or register ID.

Embodiment 4

A fourth embodiment of the invention is described next with reference to FIG. 11. This embodiment of the invention prints positioning information 47 indicating the location of the receipt printer 20 on the receipt R. The differences between this and the preceding embodiments are described below.

Note, further, that like parts in this and the first embodiment are identified by the same reference numerals, and further detailed description thereof is omitted. In addition, variations that can be applied to like parts in the first embodiment can also be applied in this embodiment.

The control configuration of the receipt printer 20 in this embodiment complements the control configurations of the receipt printer 20 according to the first to third embodiments of the invention with the addition of a GPS receiver (not shown in the figure). The functional configuration of the receipt printer 20 according to this embodiment of the invention is the same as the functional configuration of the receipt printer 20 according to any of the first to third embodiments of the invention with the addition of a positioning information acquisition unit (not shown in the figure).

The positioning information acquisition unit receives positioning signals from a plurality of GPS satellites by means of the GPS receiver, and acquires positioning information (GPS information) therefrom. Note that the positioning information is acquired when the receipt printer 20 is first set up, and is stored in nonvolatile memory 26.

Figure 11:
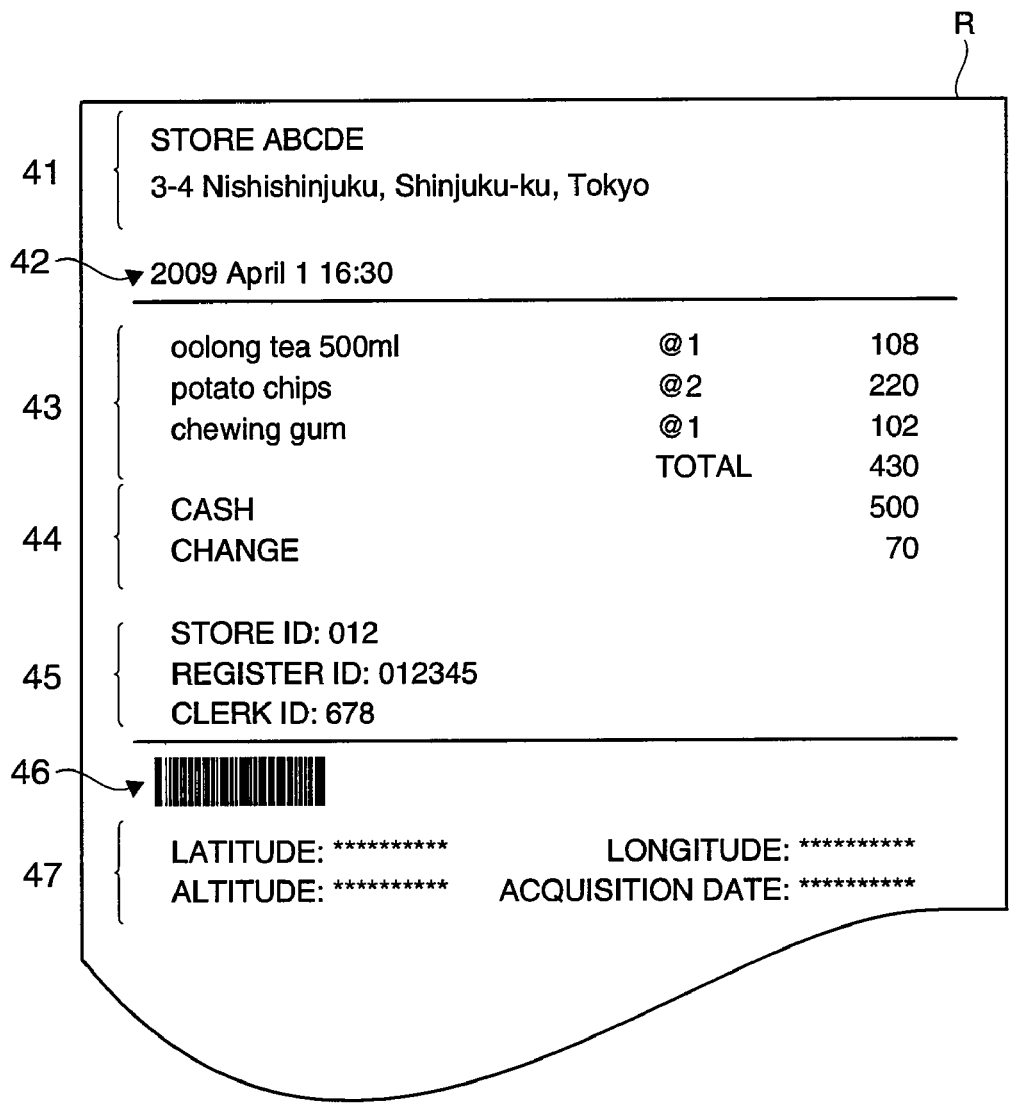
FIG. 11 shows an example of a receipt printed by a fourth embodiment of the invention.

FIG. 11 shows an example of a receipt R printed by the fourth embodiment of the invention. As shown in the figure, positioning information 47 is printed as text information on the receipt R in addition to the items 41 to 46 that are printed in the first embodiment (see FIG. 2). More specifically, the positioning information 47 includes the latitude, longitude, altitude, and acquisition date and time (the date and time the positioning information was acquired). Note that the positioning information 47 is not information contained in the transaction information, and is information that is added by the receipt printer 20 similarly to the barcode 46.

As described above, because positioning information 47 is printed on the receipt R in this fourth embodiment of the invention, it can be read by the scanner 30 and used to determine the authenticity of a receipt R. For example, the positioning information 47 is compared with the actual store location, and if the difference therebetween is within a specified range, the receipt R is determined to have been issued officially (that is, is not counterfeit). Even if a receipt printer 20 is stolen and a counterfeit receipt is produced, the authenticity of the receipt can be accurately determined. Security can be further improved and the counterfeiting prevention effect can be improved by combining this embodiment with the first to third embodiments of the invention.

Note, further, that the positioning information 47 may be printed as text information or it may be encoded. The positioning information 47 may also be printed in the barcode 46.

The positioning information acquisition unit in the above example acquires the positioning information when the power is turned on the first time the receipt printer 20 is set up, but the positioning information may be acquired and the positioning information stored in the nonvolatile memory 26 may be updated every time the receipt printer 20 power turns on.

Further alternatively, the positioning information may be acquired regularly after the first time the printer is set up, and the positioning information in the nonvolatile memory 26 may be updated when the positioning information changes. These configurations enable verifying receipt R authenticity more accurately even if both the POS terminal 10 and receipt printer 20 are stolen.

In addition to the foregoing four embodiments, the components and processes of the receipt issuing systems SY according to the present invention described above can also be rendered as a program. The program can also be provided stored on a recording medium such as a CD-ROM, or flash memory device, for example. More specifically, a program that causes a computer to function as the component parts of the receipt issuing system SY described above, a program that causes a computer to execute the steps of the processing methods of the receipt issuing system SY described above, and a recording medium recording these programs are also included in the scope of the invention.

The foregoing embodiments of the invention are also described as being applied to a receipt printer 20, but can also be applied to devices that can produce printout other than receipts R. Examples of such printout include coupons, gift certificates, verification documents, receipts, lottery tickets, and certificates. More specifically, application of the invention is effective when producing printed output that requires protection against counterfeiting, such as when printing output that can be exchanged for money or can be used as a certificate of proof. Other variations that do not depart from the scope of the accompanying claims will also be obvious to one with ordinary skill in the related art.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A receipt printer comprising:
a storage unit in the receipt printer that stores encrypted information obtained by encrypting registered information;
a transaction information acquisition unit that acquires transaction information from a POS terminal;
a specific information acquisition unit that acquires specific information from an external source;
a comparison unit that compares the specific information with the registered information decrypted from the encrypted information;
a printing permission unit that permits printing when the comparison unit verifies a data match; and
a printing unit that prints transaction information when printing is permitted by the printing permission unit.

2. The receipt printer described in claim 1, wherein:
the specific information acquisition unit acquires the specific information contained in the transaction information acquired from a POS terminal as the external source; and
the printing unit prints the transaction information when printing is permitted by the printing permission unit.

3. The receipt printer described in claim 1, wherein:
the specific information acquisition unit acquires the specific information by reading a specific recording medium as the external source.

4. The receipt printer described in claim 3, wherein:
the specific recording medium is a magnetic card, an IC card, or a printed medium on which a specific code is printed.

5. The receipt printer described in claim 1, wherein:
the registered information includes at least one of a store ID identifying a store where the receipt printer and POS terminal are installed, a register ID uniquely identifying a POS terminal, and a clerk ID identifying an operator of a cash register in the store.

6. A receipt printer comprising:
a storage unit in the receipt printer that stores registered information;
a reading unit that reads a specific recording medium to which first specific information is recorded;
a first comparison unit that compares the first specific information and the registered information;
a mode setting unit that when the first comparison unit verifies a data match activates a printing enabled mode permitting printing;
a transaction information acquisition unit that acquires transaction information from a POS terminal;

a second specific information acquisition unit that acquires second specific information contained in the transaction information;

a second comparison unit that compares the second specific information and the registered information;

a printing permission unit that permits printing when the printing enabled mode is active and the second comparison unit confirms a data match; and a printing unit that prints the transaction information when printing is permitted by the printing permission unit.

7. The receipt printer described in claim 6, wherein:
the storage unit stores encrypted information obtained by encrypting the registered information; and
the first comparison unit and second comparison unit use the registered information decrypted from the encrypted information for comparison.

8. The receipt printer described in claim 7, wherein:
the printing unit prints the registered information or the encrypted information together with the transaction information.

9. The receipt printer described in claim 6, wherein:
the mode setting unit activates, in conjunction with receipt printer power turning off, a printing disabled mode that does not permit printing.

10. The receipt printer described in claim 6, further comprising:
a switching signal acquisition unit that acquires from the POS terminal a switching signal for switching to a printing disabled mode that does not permit printing;
the mode setting unit activating the printing disabled mode when the switching signal is received.

11. The receipt printer described in claim 6, further comprising:
a positioning information acquisition unit that acquires positioning information indicating an installation position of the receipt printer;
the printing unit printing the positioning information together with the transaction information.

12. A control method executed by a receipt printer having a storage unit that stores encrypted information obtained by encrypting registered information, the control method comprising:
acquiring specific information from an external source;
reading the encrypted information from the storage unit and decrypting the encrypted information;
comparing the acquired specific information and the decrypted registered information; and
permitting printing when a data match is confirmed;
printing transaction information acquired from a POS terminal.

13. The control method described in claim 12, wherein:
the acquiring step acquires specific information contained in the transaction information acquired from the POS terminal as the external source.

14. The control method described in claim 12, wherein:
the acquiring step acquires the specific information by reading a specific recording medium as the external source.

15. A control method executed by a receipt printer having a storage unit that stores registered information, the control method comprising:
reading a specific recording medium to which first specific information is recorded;
comparing the first specific information and the registered information read from the storage unit;
setting a printing mode to a printing enabled mode permitting printing when a data match between the first specific information and the registered information is confirmed;
acquiring transaction information containing second specific information from a POS terminal;
comparing the acquired second specific information and the registered information read from the storage unit;
permitting printing when the printing enabled mode is active and a data match between the second specific information and the registered information is confirmed; and
printing the transaction information when printing is permitted.

16. The control method described in claim 15, wherein:
the setting step activates, in conjunction with the receipt printer power turning off, a printing disabled mode that does not permit printing.

17. The control method described in claim 15, further comprising:
acquiring from the POS terminal a switching signal for switching to a printing disabled mode that does not permit printing;
the setting step activates the printing disabled mode when the switching signal is received.

18. A non-transitory computer readable medium storing a program thereon, the program being configured to cause a computer to execute the steps of the control method for a receipt printer described in claim 12.

19. A non-transitory computer readable medium storing a program thereon, the program being configured to cause a computer to execute the steps of the control method for a receipt printer described in claim 15.

* * * * *